(12) United States Patent
Kwon et al.

(10) Patent No.: US 10,442,154 B2
(45) Date of Patent: Oct. 15, 2019

(54) COMPOSITE STRUCTURE AND METHOD FOR BARELY VISIBLE IMPACT DAMAGE DETECTION

(71) Applicant: The Boeing Company, Chicago, IL (US)

(72) Inventors: Hyukbong Kwon, Mukilteo, WA (US); Kanna M. Pham, Renton, WA (US); Nicholas A. Brigman, Everett, WA (US); Charles Everson, Seattle, WA (US)

(73) Assignee: The Boeing Company, Chicago, IL (US)

( * ) Notice: Subject to any disclaimer, the term of this patent is extended or adjusted under 35 U.S.C. 154(b) by 968 days.

(21) Appl. No.: 14/882,002

(22) Filed: Oct. 13, 2015

(65) Prior Publication Data

US 2017/0100911 A1    Apr. 13, 2017

(51) Int. Cl.
*B32B 5/02*    (2006.01)
*B29C 70/00*    (2006.01)

(52) U.S. Cl.
CPC .............. *B32B 5/02* (2013.01); *B29C 70/00* (2013.01); *B32B 2262/101* (2013.01); *B32B 2262/106* (2013.01); *B32B 2305/72* (2013.01)

(58) Field of Classification Search
CPC . B32B 5/02; B32B 2305/72; B32B 2262/101; B32B 2262/106; B29C 70/00; B64C 1/06; B64C 1/064; B64C 1/065
See application file for complete search history.

(56) References Cited

U.S. PATENT DOCUMENTS

| | | | | |
|---|---|---|---|---|
| 4,917,938 A | * | 4/1990 | Mohan | B29C 70/08 428/215 |
| 5,905,260 A | * | 5/1999 | Sage | G01L 1/24 250/307 |
| 2001/0053432 A1 | * | 12/2001 | Hamilton | B29C 70/30 428/192 |
| 2006/0234007 A1 | * | 10/2006 | Durand | B64C 1/062 428/122 |
| 2008/0087768 A1 | * | 4/2008 | Lloyd | B64C 1/064 244/123.1 |
| 2008/0128430 A1 | * | 6/2008 | Kovach | B32B 27/00 220/586 |
| 2009/0304905 A1 | * | 12/2009 | Graham | B05D 3/0254 427/8 |
| 2011/0220006 A1 | * | 9/2011 | Kaye | B29C 70/763 116/201 |
| 2016/0159453 A1 | | 6/2016 | Korenga et al. | |

FOREIGN PATENT DOCUMENTS

WO    WO 2009/019511    2/2009

* cited by examiner

*Primary Examiner* — Brian Handville
(74) *Attorney, Agent, or Firm* — Walters & Wasylyna LLC (57) ABSTRACT

A composite structure including a composite body having an outer surface and a detection layer connected to the outer surface, the detection layer being discontinuous and including glass fibers embedded in a matrix material.

20 Claims, 10 Drawing Sheets

COMPOSITE STRUCTURE AND METHOD FOR BARELY VISIBLE IMPACT DAMAGE DETECTION

FIELD

This application relates to composite structures and, more particularly, to barely visible impact damage (BVID) detection for composite structures.

BACKGROUND

Composite materials typically include a reinforcement material (e.g., fibers, such as carbon fiber sheets) and a matrix material (e.g., a thermosetting resin, such as an epoxy resin). A composite structure may be formed by laying up (e.g., in a mold) multiple layers of composite material, such as by using a prepreg technique or a preform technique, and then curing the resulting layup.

Composite materials, particularly fiber-reinforced plastics, offer various advantages over traditional materials. For example, carbon fiber-reinforced plastics (CFRP) offer an advantageous combination of high strength and relatively light weight (a high strength-to-weight ratio). Therefore, high-performance composite materials, such as carbon fiber-reinforced plastics, can be substituted for traditional materials (e.g., metal and wood) and, as such, find various applications in the aerospace industry, as well as in other industries (e.g., automotive and marine). For example, various aircraft structures, such as stringers (e.g., blade stringers) are constructed from composite materials (e.g., carbon fiber-reinforced plastic).

Structures formed from composite materials are susceptible to barely visible impact damage (BVID) when exposed to a low-energy/low-velocity impact. While the surface of a composite structure with barely visible impact damage may show little or no visible signs of damage, such impacts may cause subsurface damage, such as delamination, which may be difficult to detect without sophisticated qualitative analysis (e.g., guided wave ultrasonic testing).

Accordingly, those skilled in the art continue with research and development efforts in the field of barely visible impact damage.

SUMMARY

In one embodiment, the disclosed composite structure may include a composite body having an outer surface and a detection layer connected to the outer surface, the detection layer may be discontinuous, and may include glass fibers and a matrix material.

In another embodiment, the disclosed stringer may include a composite body formed from a plurality of composite plies, the composite body including a web portion having a proximal end and a distal end, and a base portion connected to the proximal end, and a detection layer connected to the distal end of the web portion, the detection layer being discontinuous and including glass fibers and a matrix material.

In yet another embodiment, disclosed is a method for detecting barely visible impact damage on a composite body that includes an outer surface and a plurality of composite plies. The method may include the step of connecting to the outer surface a detection layer including glass fibers embedded in a matrix material, wherein the detection layer is discontinuous.

Other embodiments of the disclosed composite structure and method for barely visible impact damage detection will become apparent from the following detailed description, the accompanying drawings and the appended claims.

DETAILED DESCRIPTION

Figure 1:
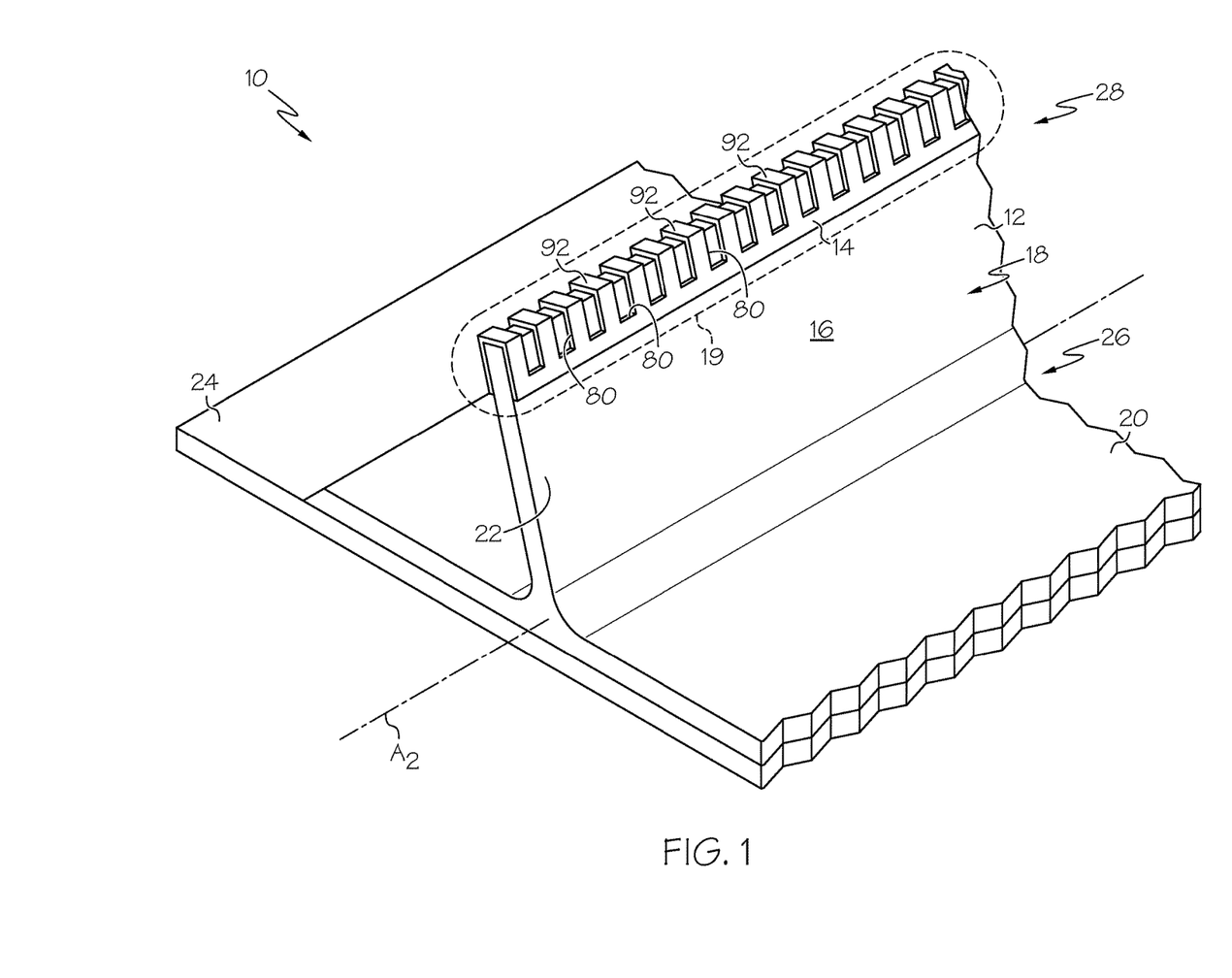
FIG. 1 is a perspective view of one embodiment of the disclosed composite structure.
Figure 2:
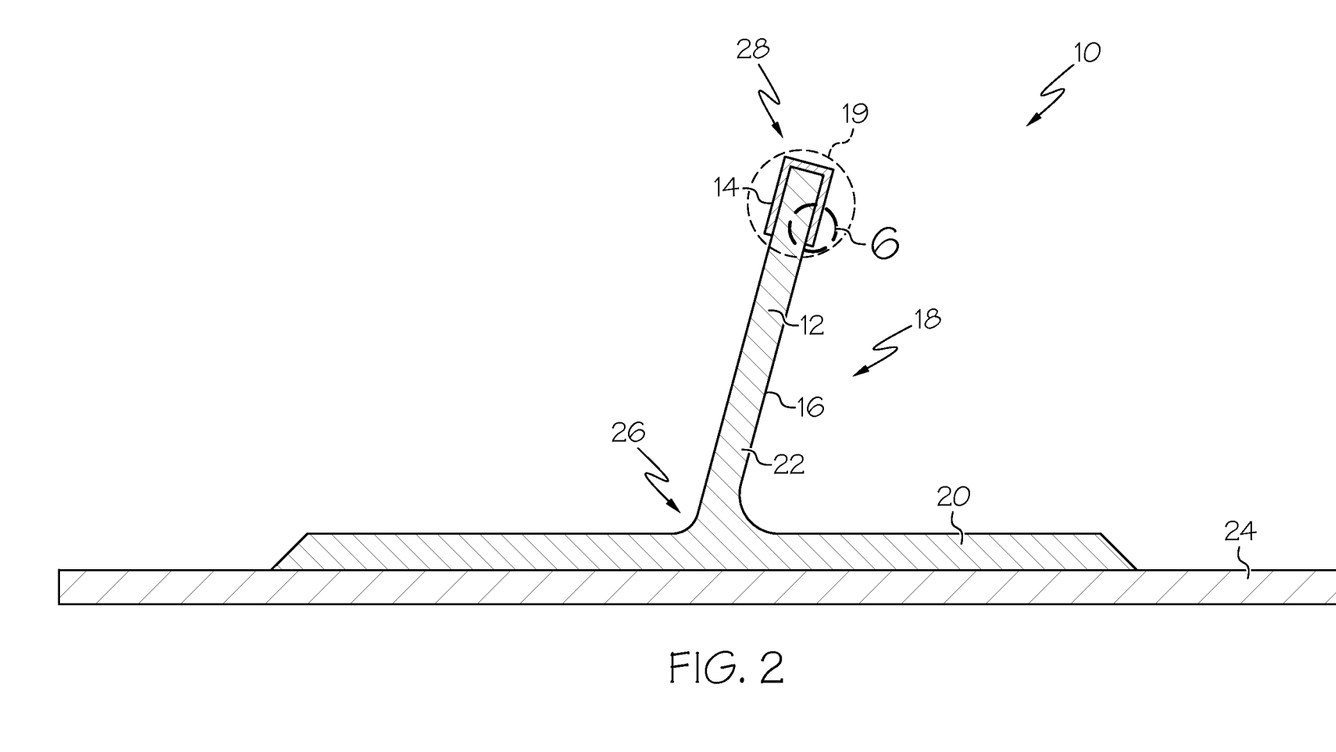
FIG. 2 is a side elevational view, in cross-section, of the composite structure of FIG. 1.

Referring to FIGS. 1 and 2, one embodiment of the disclosed composite structure, generally designated 10, may include a composite body 12 and a detection layer 14. The composite body 12 may include an outer surface 16, and the detection layer 14 may be connected to all or a portion of the outer surface 16, thereby defining a detection zone 19 of the composite structure 10. The detection layer 14 may enhance barely visible impact damage (BVID) visualization within the detection zone 19.

Figure 14:
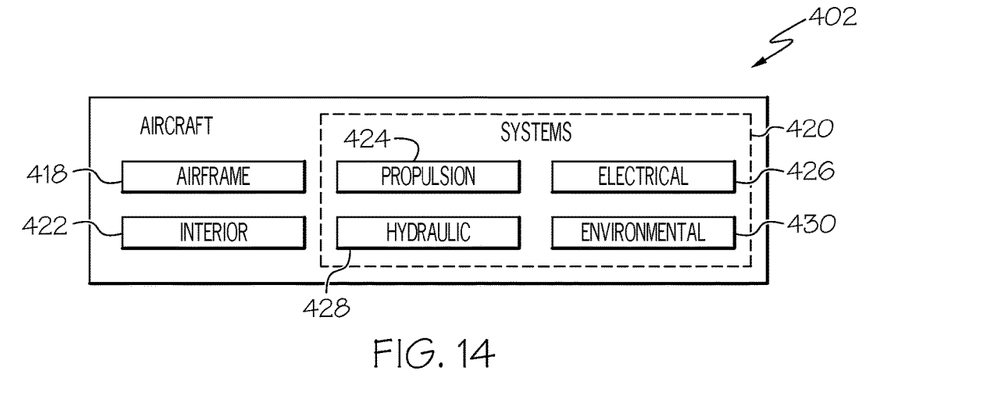
FIG. 14 is a block diagram of an aircraft.

The composite body 12 of the composite structure 10 may be a structural component of a vehicle, such as a structural component of the airframe 418 (FIG. 14) of an aircraft 402 (FIG. 14). While aircraft stringers are specifically shown and described, those skilled in the art will appreciate that the disclosed composite structures 10 may serve as various structures and structural components, whether within the aerospace industry, the automotive industry or otherwise, without departing from the scope of the present disclosure.

As shown in FIGS. 1 and 2, the composite body 12 may be a blade stringer 18, and may include a base portion 20 and a web portion 22. The base portion 20 may be connected to the skin 24 of an aircraft 402 (FIG. 14). The web portion 22 may include a proximal end 26 connected to the base portion 20 and a distal end 28 opposed from the proximal end 26. The detection layer 14 may be connected to the distal end 28 of the web portion 22.

Figure 3:
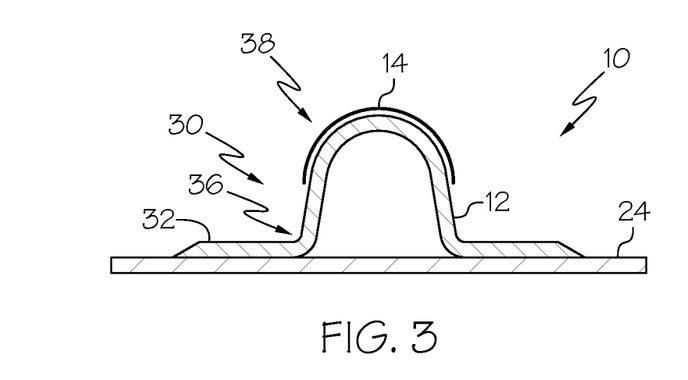
FIG. 3 is a side elevational view, in cross-section, of one variation to the composite structure shown in FIG. 1.

As shown in FIG. 3, in one variation, the composite body 12 of the composite structure 10 may be a hat stringer 30. The hat stringer 30 may include a base portion 32 and a web portion 34. The base portion 32 may be connected to the skin 24 of an aircraft 402 (FIG. 14). The web portion 34, which may be dome-shaped (as shown in FIG. 3), square-shaped, triangular-shaped (commonly referred to as a "witch hat" shape) or the like, may include a proximal end 36 connected to the base portion 32 and a distal end 38 opposed from the proximal end 36. The detection layer 14 may be connected to the distal end 38 of the web portion 34 of the hat stringer 30.

Figure 4:
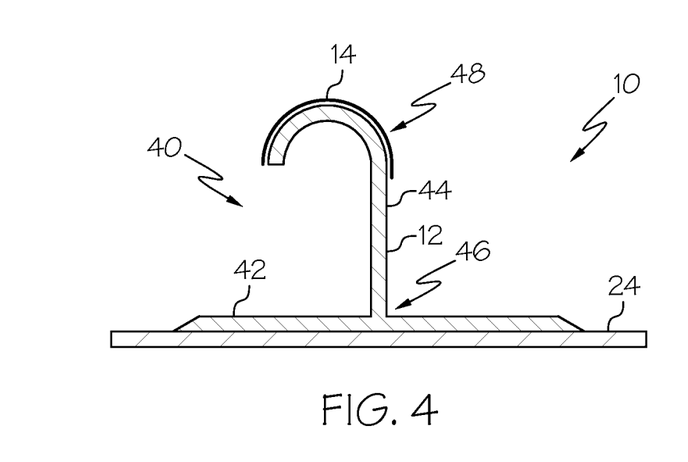
FIG. 4 is a side elevational view, in cross-section, of another variation to the composite structure shown in FIG. 1.

As shown in FIG. 4, in another variation, the composite body 12 of the composite structure 10 may be a J-type stringer 40. The J-type stringer 40 may include a base portion 42 and a J-shaped web portion 44. The base portion 42 may be connected to the skin 24 of an aircraft 402 (FIG. 14). The web portion 44 may include a proximal end 46 connected to the base portion 42 and a distal end 48 opposed from the proximal end 46. The detection layer 14 may be connected to the distal end 48 of the web portion 44 of the J-type stringer 40.

Figure 5:
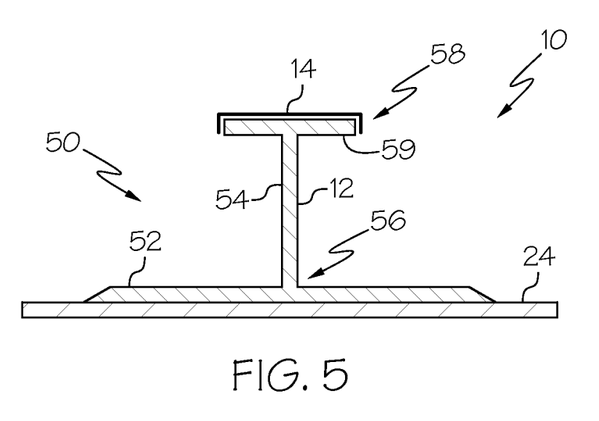
FIG. 5 is a side elevational view, in cross-section, of yet another variation to the composite structure shown in FIG. 1.

As shown in FIG. 5, in yet another variation, the composite body 12 of the composite structure 10 may be an I-type stringer 50. The I-stringer 50 may include a base portion 52 and a web portion 54. The base portion 52 may be connected to the skin 24 of an aircraft 402 (FIG. 14). The web portion 54 may include a proximal end 56 connected to the base portion 52 and a distal end 58 opposed from the proximal end 56. The distal end 58 of the web portion 54 may include a cap 59, and the detection layer 14 may be connected to the cap 59.

Figure 6:
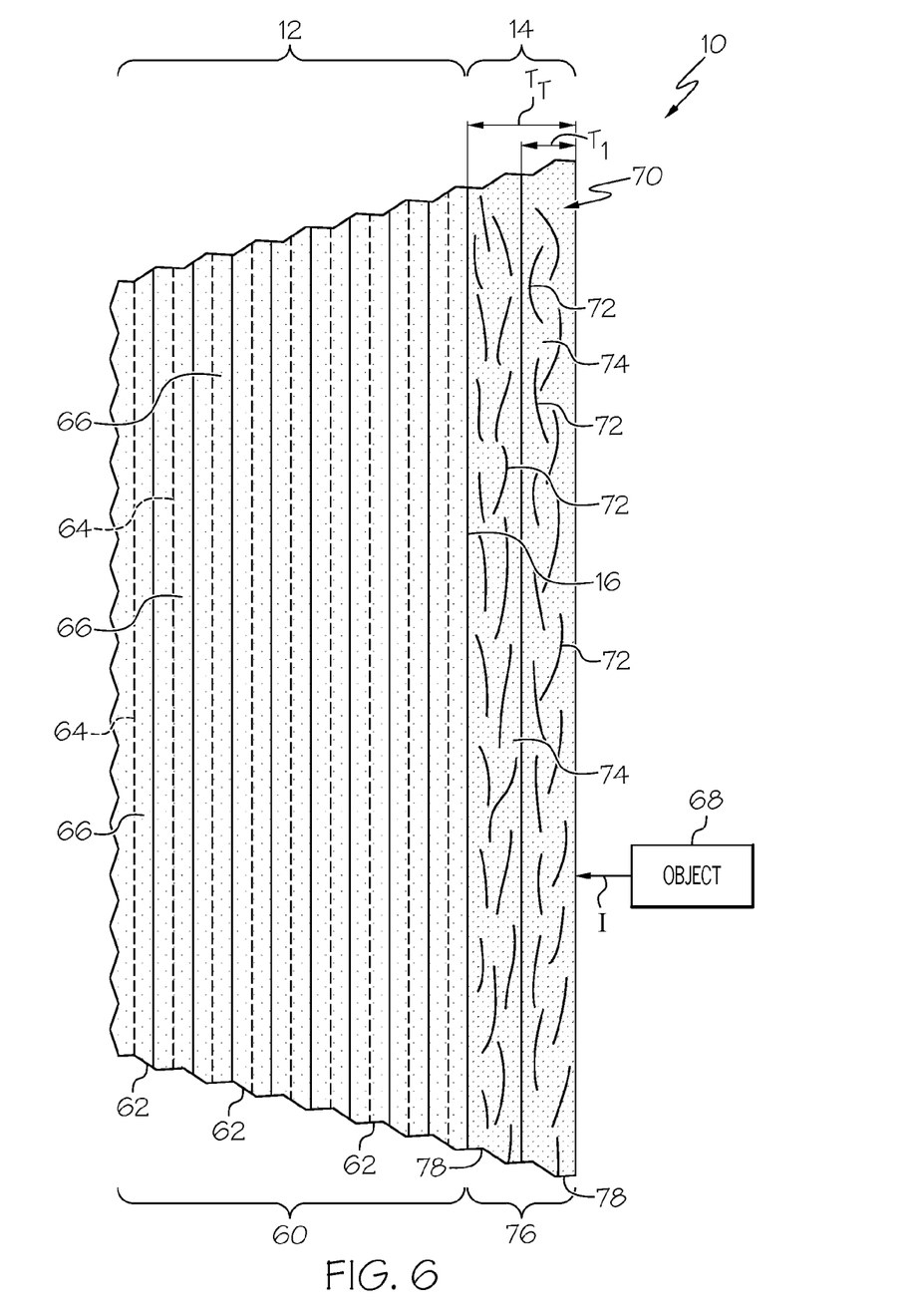
FIG. 6 is a detailed cross-sectional view of a portion of the composite structure shown in FIG. 2.

Referring to FIG. 6, the composite body 12 of the composite structure 10 may have a laminate structure 60 that includes a plurality of composite plies 62. Each ply 62 of the laminate structure 60 may include a reinforcement material 64 and a matrix material 66. The reinforcement material 64 may be embedded in the matrix material 66. The matrix material 66 may be cured prior to placing the composite body 12 into service. The composition of the laminate structure 60, as well as the number of plies 62 forming the laminate structure 60, may widely vary—they are design considerations dictated by, among other things, the intended application of the composite body 12.

In one particular construction, the composite body 12 may be formed from (or may include) carbon fiber-reinforced plastic (CFRP). For example, the reinforcement material 64 of each ply 62 of the laminate structure 60 of the composite body 12 may include carbon fibers, such as a carbon fiber fabric, and the matrix material 66 may be a thermosetting resin, such as epoxy resin, or, alternatively, a thermoplastic resin, such as polyether ether ketone (PEEK), polyether ketone ketone (PEKK), polyphenaline sulfide (PPS), polyethylene, polypropylene, and polystyrene. Additional reinforcement materials may be used in combination with carbon fibers without departing from the scope of the present disclosure.

Still referring to FIG. 6, the detection layer 14 of the composite structure 10 may be connected to the outer surface 16 of the composite body 12. Therefore, in the event an object 68 impacts (arrow I) the composite structure 10 within the detection zone 19 (FIGS. 1 and 2), the impact (arrow I) will be received by the detection layer 14. Because of the disclosed composition and structure of the detection layer 14, such an impact (arrow I) may leave an indication on the composite structure 10 that is substantially more visible as compared to the same impact (arrow I) occurring on a composite structure 10 with the detection layer 14 omitted.

The detection layer 14 of the composite structure 10 may be formed from (or may include) a glass fiber-reinforced plastic 70, which is commonly referred to as fiberglass. The glass fiber-reinforced plastic 70 may include glass fibers 72 and a matrix material 74, wherein the glass fibers 72 are embedded in the matrix material 74. The matrix material 74 may be (or may include) a thermosetting resin or, alternatively, a thermoplastic resin. As one specific, non-limiting example, the matrix material 74 may be an epoxy resin.

As shown in FIG. 6, the detection layer 14 may be a stacked structure 76 that includes multiple plies 78 of glass fiber-reinforced plastic 70 (only two plies 78 are shown in FIG. 6). While not specifically shown, it is also contemplated that the detection layer 14 may include only a single ply 78. Each ply 78 of the detection layer 14 may have a cross-sectional thickness $T_1$. As one non-limiting example, the cross-sectional thickness $T_1$ may range from about 0.005 inch (0.127 millimeters) to about 0.015 inch (0.381 millimeters).

The detection layer 14 may have a total cross-sectional thickness $T_T$, which may depend on the total number of plies 78 and the cross-sectional thickness $T_1$ of each ply 78. It is presently believed that the visual indication created by an impact (arrow I) within the detection zone 19 (FIGS. 1 and 2) may become more substantial as the total cross-sectional thickness $T_T$ of the detection layer 14 increases. However, the total weight of the composite structure 10 also increases as the total cross-sectional thickness $T_T$ of the detection layer 14 increases. Therefore, those skilled in the art will appreciate the need to optimize the total cross-sectional thickness $T_T$ of the detection layer 14 based on the particular application. For example, in an aerospace application (e.g., for the blade stringer 18 shown in FIGS. 1 and 2) the total cross-sectional thickness $T_T$ of the detection layer 14 may range from about 0.005 inch (0.127 millimeters) to about 0.050 inch (1.27 millimeters).

Referring back to FIG. 1, the detection layer 14 of the composite structure 10 may be discontinuous. As such, portions of the underlying composite body 12 are readily visible through the detection layer 14. Without being limited to any particular theory, it is believed that using a detection layer 14 that includes glass fibers 72 (FIG. 6) and that is discontinuous (rather than continuous) substantially increases the amount of exposed edge 80 within the detection layer 14, thereby exposing more glass fibers 72 of the glass fiber-reinforced plastic 70 (FIG. 6). As such, an impact (arrow I in FIG. 6) with relatively less energy may create relatively more visual indication of an impact.

Furthermore, without being limited to any particular theory, it is believed that a composite structure 10 having a detection layer 14 that includes glass fibers 72 (FIG. 6) and that is discontinuous is less likely to accumulate a static charge, as compared to a composite structure having a detection layer that includes glass fibers, but that is continuous. As such, the disclosed composite structure 10 may be suitable for use within regions with high electrostatic charges, such as within the fuel tank of an aircraft.

Figure 7:
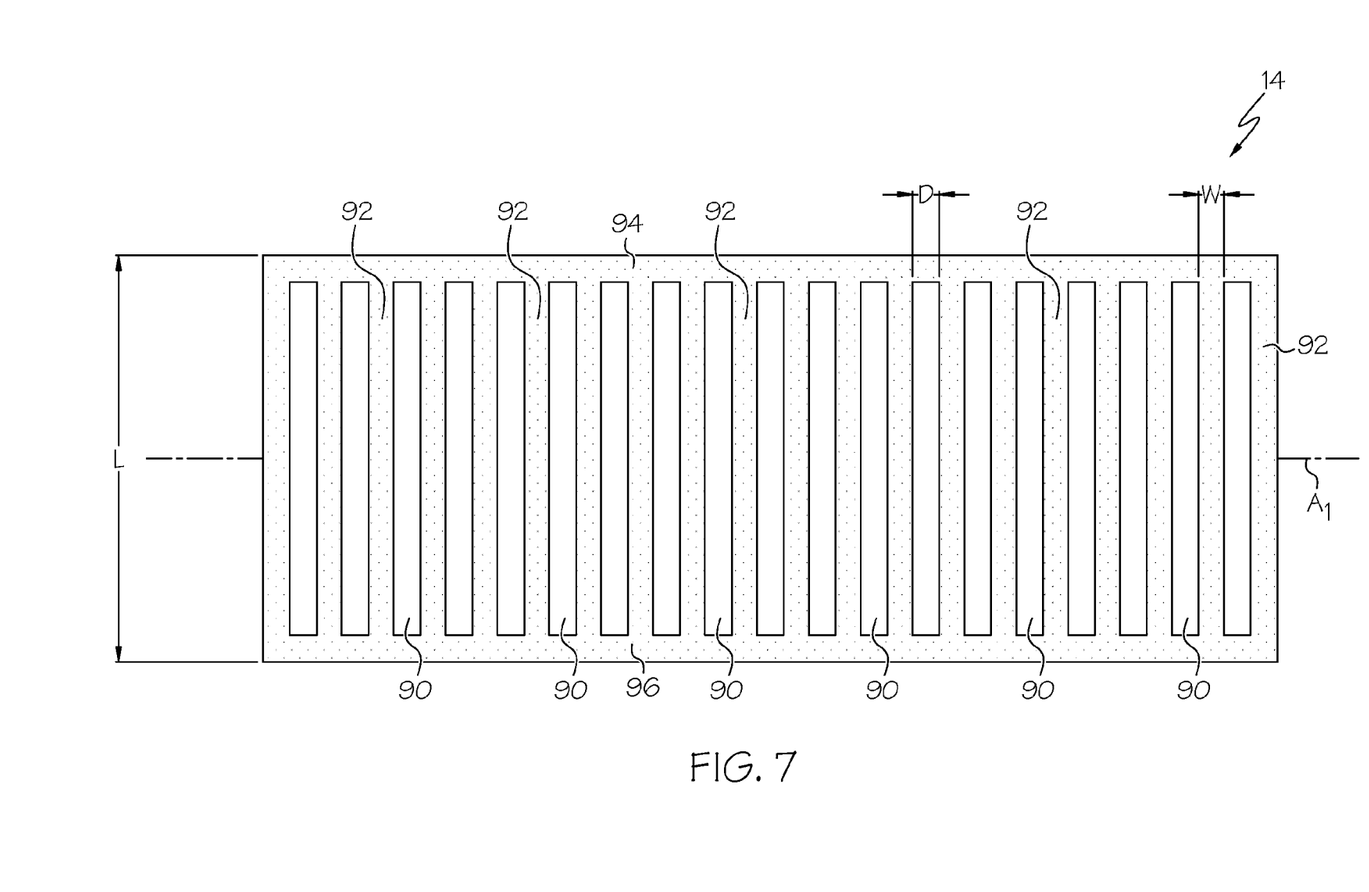
FIG. 7 is a plan view of the detection layer of the composite structure of FIG. 1, shown prior to application of the detection layer to the composite body.

Referring now to FIG. 7, in one particular implementation, the detection layer 14 of the composite structure 10 (FIG. 1) may extend along a longitudinal axis $A_1$, and may be rendered discontinuous by forming (e.g., cutting) slots 90 within the plies 78 (FIG. 6) of glass fiber-reinforced plastic 70 (FIG. 6) forming the detection layer 14. The slots 90 may define a plurality of strips 92, which may laterally extend between a first extension member 94 and a second extension member 96. Therefore, the detection layer 14 may have a ladder-like configuration in plan view (FIG. 7), wherein the longitudinally-extending extension members 94, 96 of the detection layer 14 connect together the strips 92 and maintain the strips 92 at the desired spacing.

Each strip 92 of the detection layer 14 may have a width W, a length L, and may be longitudinally spaced a distance D from adjacent strips 92. The length L of each strip 92 may depend on, among other things, the size and/or shape of the underlying composite body 12 (FIG. 1). The width W of each strip 92 and the distance D between adjacent strips 92 may be a design consideration subject to optimization for a given composite body 12 and application. In one specific, non-limiting aerospace application (e.g., for the blade stringer 18 shown in FIGS. 1 and 2), the strips 92 may have a width W ranging from about 0.1 inch (2.54 millimeters) to about 0.5 inch (12.7 millimeters), such as about 0.25 inch (6.35 millimeters), and a distance D between adjacent strips 92 ranging from about 0.1 inch (2.54 millimeters) to about 0.5 inch (12.7 millimeters), such as about 0.25 inch (6.35 millimeters).

As shown in FIG. 1, the detection layer 14 may be connected to the composite body 12 such that the longitudinal axis $A_1$ (FIG. 7) of the detection layer 14 is substantially aligned with the longitudinal axis $A_2$ of the composite body 12. Therefore, in the case of the blade stringer 18 shown in FIG. 1, the detection layer 14 may be folded over the distal end 28 of the web portion 22 to form a longitudinally extending row of spaced apart strips 92 along the length of the web portion 22.

Figure 8:
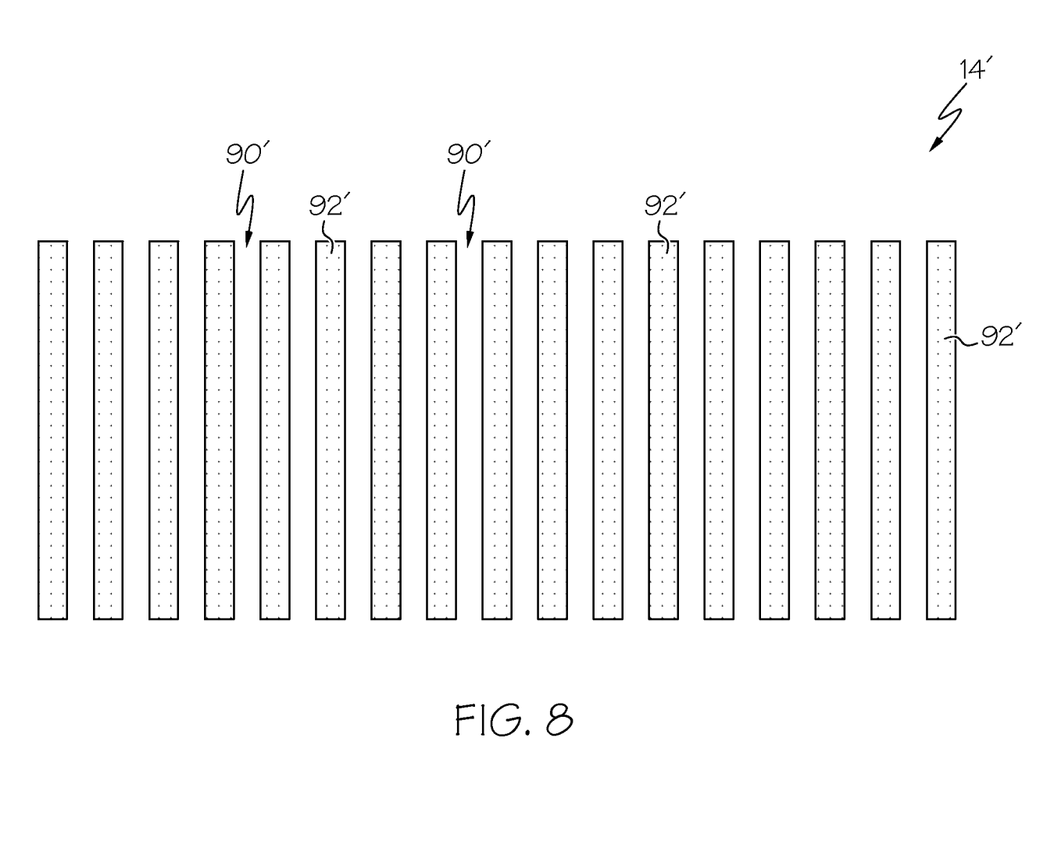
FIG. 8 is a plan view of one variation to the detection layer shown in FIG. 7.

As shown in FIG. 8, in one alternative implementation, the extension members 94, 96 (FIG. 7) may be omitted such that the detection layer 14' of the composite structure 10 (FIG. 1) includes a plurality of separate (not interconnected) strips 92'. Slots 90' may be defined between adjacent strips 92' of the detection layer 14'

At this point, those skilled in the art will appreciate that various techniques may be used to render discontinuous the detection layer 14. While the formation of regular and uniform slots 90, 90' (FIGS. 7 and 8) is shown and described, any regular or irregular openings, whether patterned uniformly or not, may be sufficient to achieve discontinuity and the desired exposed edges 80, without departing from the scope of the present disclosure.

Figure 9:
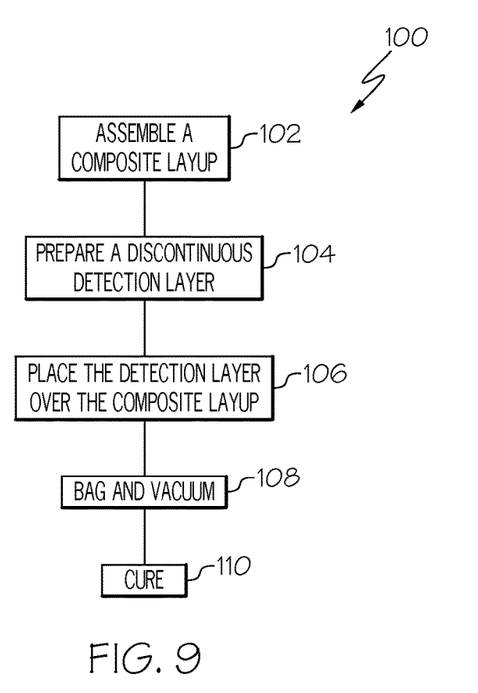
FIG. 9 is a flow diagram depicting one embodiment of the disclosed method for manufacturing a composite structure.

Also disclosed is a method for manufacturing the disclosed composite structure 10 using a co-curing technique. Referring to FIG. 9, one embodiment of the disclosed co-curing manufacturing method, generally designated 100, may begin at Block 102 with the step of laying up a plurality of composite plies 62 (FIG. 6) to form the laminate structure 60 (FIG. 6) of the composite body 12 (FIG. 1). The composite plies 62 may be prepreg plies and, therefore, merely require curing. However, it is also contemplated that a pre-form technique may be used, thereby requiring both resin infusion and curing.

At Block 104, a detection layer 14 (FIGS. 6 and 7) may be prepared. Preparation of the detection layer 14 may include assembling a stacked structure 76 (FIG. 6) including multiple plies 78 (FIG. 6) of glass fiber-reinforced plastic 70 (FIG. 6). Preparation of the detection layer 14 may further include cutting (e.g., die-cutting) the stacked structure 76 to achieve the desired discontinuous configuration (e.g., a ladder-like configuration, as shown in FIG. 7, or a plurality of separate strips, as shown in FIG. 8).

At Block 106, the detection layer 14 (FIG. 1) may be placed over the composite body 12 (FIG. 1) to form an uncured composite body/detection layer assembly. Placement of the detection layer 14 may require consideration of the desired location of the detection zone 19 (FIG. 1) of the resulting composite structure 10 (FIG. 1). For example, when the composite body 12 is a stringer 18 (FIG. 1), the detection layer 14 may be placed over the distal end 28 (FIG. 1) of the web portion 22 (FIG. 1) of the stringer 18, as best shown in FIGS. 1 and 2.

At Block 108, the composite body/detection layer assembly may optionally be exposed to a vacuum load. For example, the composite body/detection layer assembly may be placed into a vacuum bag and a vacuum may be drawn within the bag. The vacuum load may compact the composite body/detection layer assembly.

At Block 110, the composite body/detection layer assembly may be cured. For example, the composite body/detection layer assembly may be placed into an autoclave set at a pre-determined temperature and may remain within the autoclave for a predetermined amount of time.

Thus, the disclosed co-curing manufacturing method 100 may connect the detection layer 14 (FIG. 1) to the composite body 12 (FIG. 1) without the need for a secondary bonding process. Therefore, the disclosed co-curing manufacturing method 100 may be suitable for use in connection with composite bodies 12 that do not require certain post-curing processing proximate the detection zone 19 (FIG. 1), such as cutting/trimming (e.g., a trimmed blade stringer) or secondary bonding (e.g., bonding of cap 59 to form an I-type stringer 50, as shown in FIG. 5).

Figure 10:
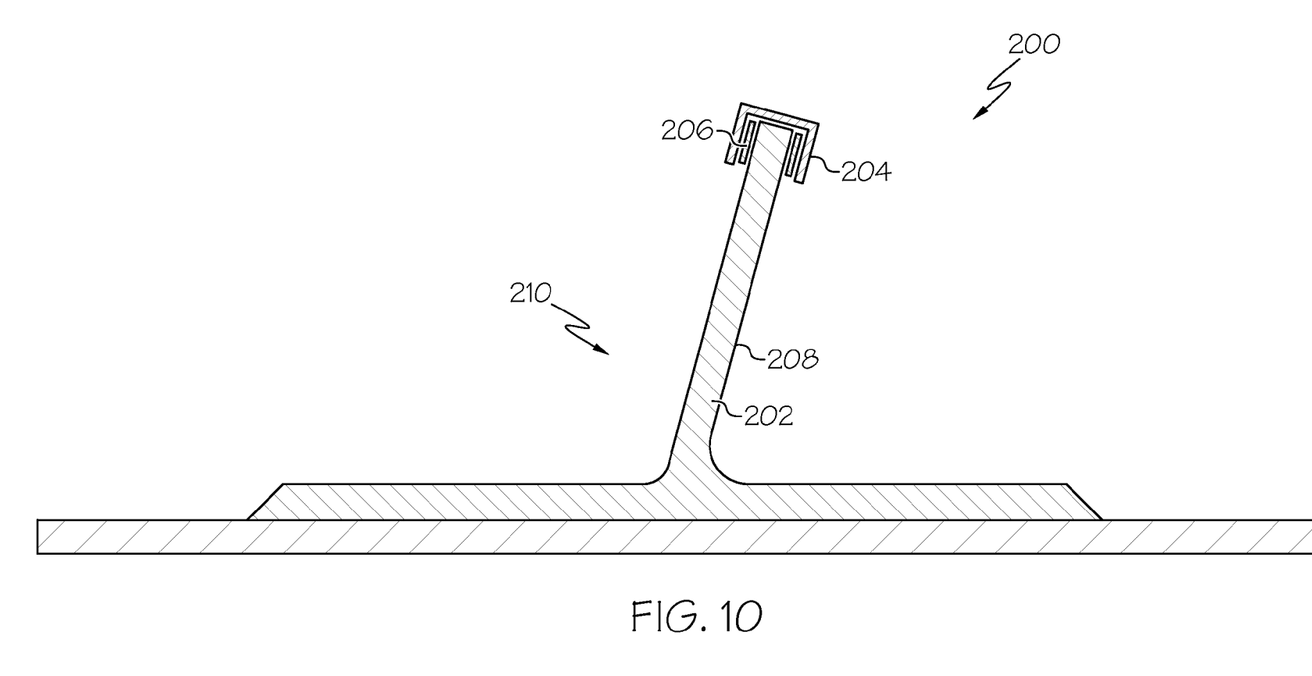
FIG. 10 is a side elevational view, in cross-section, of one alternative embodiment of the disclosed composite structure.

Referring to FIG. 10, another embodiment of the disclosed composite structure, generally designated 200, may include a composite body 202, a detection layer 204 and an adhesive 206. The composite body 202 may include an outer surface 208, and the detection layer 204 may be connected to the outer surface 208 of the composite body 202 by way of the adhesive 206.

Thus, the composite structure 200 may be substantially similar to the composite structure 10 shown in FIG. 1 and described herein. However, rather than effecting connection between the detection layer 14 and the composite body 12 by co-curing, as in the case for the composite structure 10, the connection between the detection layer 204 and the composite body 202 of the composite structure 200 may be effected by the adhesive 206.

Various adhesives may be used in connection with the composite structure 200. Those skilled in the art will appreciate that adhesive selection may require consideration of the composition of the composite body 202 and the detection layer 204, as well as other considerations, such as the intended application of the resulting composite structure 200. Non-limiting examples of adhesives suitable for bonding a glass/epoxy detection layer 204 to a carbon fiber reinforced plastic composite body 202 include epoxies (e.g., one-part epoxies or two-part epoxies, including films, pastes and liquids), silicone adhesives, polyester adhesives, urethane adhesives and acrylic adhesives.

Figure 11:
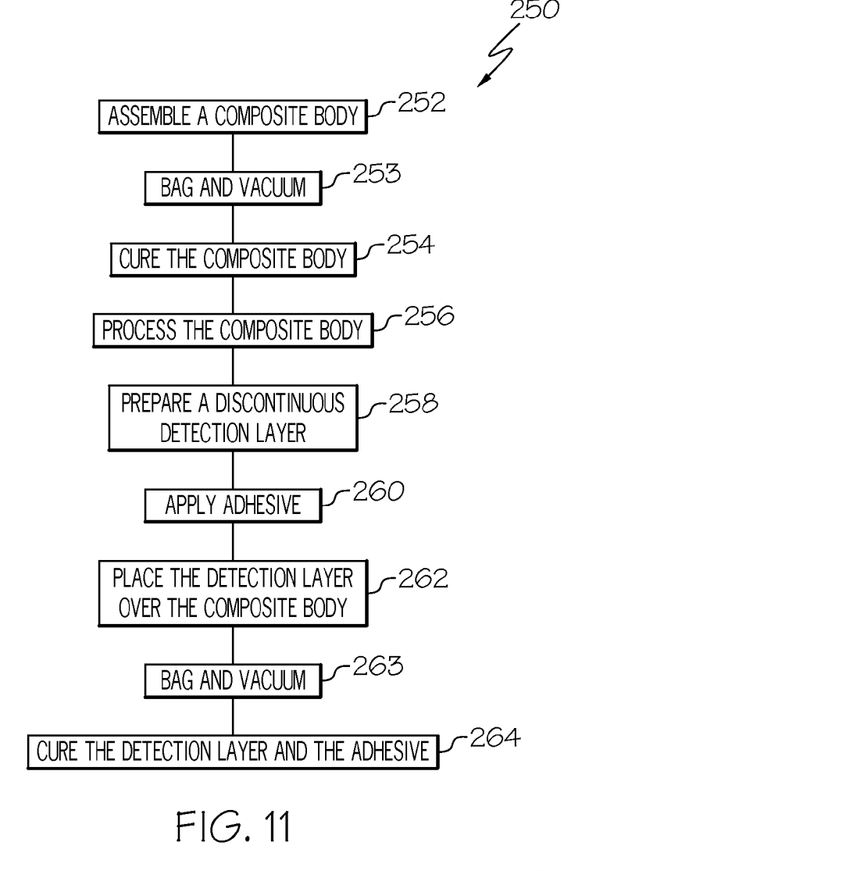
FIG. 11 is a flow diagram depicting another embodiment of the disclosed method for manufacturing a composite structure.

Also disclosed is a method for manufacturing the disclosed composite structure 200 using a bonding technique. Referring to FIG. 11, one embodiment of the disclosed bonding manufacturing method, generally designated 250, may begin at Block 252 with the step of laying up a plurality of composite plies 62 (FIG. 6) to form the laminate structure 60 (FIG. 6) of the composite body 202 (FIG. 10). The composite plies 62 may be prepreg plies and, therefore, merely require curing. However, it is also contemplated that a pre-form technique may be used, thereby requiring both resin infusion and curing.

At Block 253, the uncured composite body 202 (FIG. 10) may optionally be exposed to a vacuum load. For example, the uncured composite body 202 may be placed into a vacuum bag and a vacuum may be drawn within the bag. The vacuum load may compact the uncured composite body 202.

At Block 254, the composite body 202 (FIG. 10) may be cured. For example, the composite body 202 may be placed into an autoclave set at a pre-determined temperature for a predetermined amount of time.

At Block 256, the composite body 202 (FIG. 10) may be processed, such as by cutting/trimming the composite body 202, surface preparation (e.g., for receiving an adhesive) and/or connecting additional members (e.g., a cap 59 (FIG. 5)) to the composite body 202. For example, the composite body 202 may be a blade stringer 210, as shown in FIG. 10, and the distal end 28 (FIG. 1) of the web portion 22 (FIG. 1) of the blade stinger 210 may be cut/trimmed.

At Block 258, a detection layer 204 (FIG. 10) may be prepared. Preparation of the detection layer 204 may include assembling a stacked structure 76 (FIG. 6) including multiple plies 78 (FIG. 6) of glass fiber-reinforced plastic 70 (FIG. 6). Preparation of the detection layer 204 may further include cutting (e.g., die-cutting) the stacked structure 76 to achieve the desired discontinuous configuration (e.g., a ladder-like configuration, as shown in FIG. 7, or a plurality of separate strips, as shown in FIG. 8).

At Block 260, an adhesive 206 (FIG. 10) may be applied. The adhesive 206 may be applied to the composite body 202 (FIG. 10), to the detection layer 204 (FIG. 10) or to both the composite body 202 and the detection layer 204.

At Block 262, the detection layer 204 (FIG. 10) may be placed over the composite body 202 (FIG. 10). Placement of the detection layer 204 may require consideration of the desired location of the detection zone 19 (FIG. 1) of the resulting composite structure 200 (FIG. 10).

At Block 263, the composite body 202/adhesive 206/detection layer 204 assembly (see FIG. 10) may optionally be exposed to a vacuum load. For example, the composite body 202/adhesive 206/detection layer 204 assembly may be placed into a vacuum bag and a vacuum may be drawn within the bag. The vacuum load may compact the composite body 202/adhesive 206/detection layer 204 assembly.

At Block 264, the composite body 202/adhesive 206/detection layer 204 assembly (see FIG. 10) may be cured. As one example, curing the composite body 202/adhesive 206/detection layer 204 assembly may include allowing the composite body 202/adhesive 206/detection layer 204 assembly to set for a predetermined amount of time. As another example, curing the composite body 202/adhesive 206/detection layer 204 assembly may include heating the composite body 202/adhesive 206/detection layer 204 assembly, such as in an autoclave. As yet another example, curing the composite body 202/adhesive 206/detection layer 204 assembly may include exposing the composite body 202/adhesive 206/detection layer 204 assembly to a particular wavelength of electromagnetic radiation (e.g., ultraviolet light).

Thus, the disclosed bonding manufacturing method 250 may be used as an alternative to the disclosed co-curing manufacture method 100. For example, the disclosed co-curing manufacture method 100 may not be suitable for applications requiring processing (Block 256) of a cured composite body prior to application of a detection layer to the composite body. Therefore, in such cases, the disclosed bonding manufacturing method 250 may be used.

Figure 12:
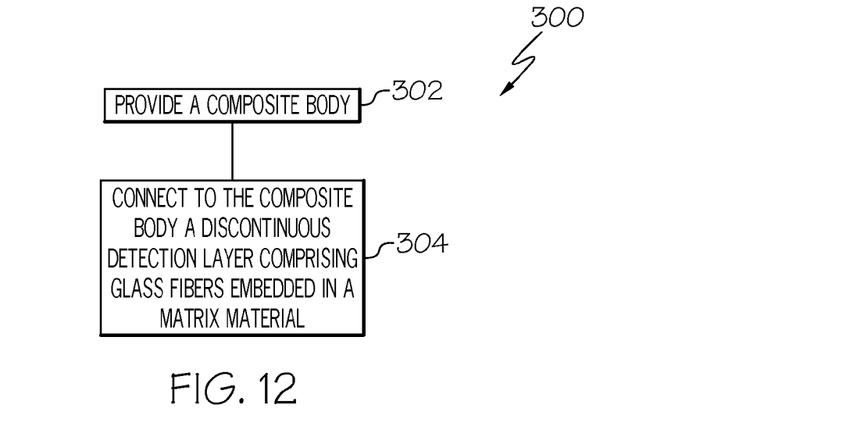
FIG. 12 is a flow diagram depicting one embodiment of the disclosed method for barely visible impact damage detection.

Referring now to FIG. 12, one embodiment of the disclosed method for barely visible impact damage detection, generally designated 300, may begin at Block 302 with the step of providing a composite body 12 (FIG. 1). The composite body 12 may include an outer surface 16 (FIG. 1) and a plurality of composite plies 62 (FIG. 6).

At Block 304, a detection layer 14 (FIG. 1) may be connected to the outer surface 16 (FIG. 1) of the composite body 12 (FIG. 1). The detection layer 14 may be discontinuous, and may include glass fibers embedded in a matrix material (e.g., epoxy resin). In one expression, the connection between the detection layer 14 and the composite body 12 may be effected by co-curing the detection layer 14 with the composite body 12. In another expression, the connection between the detection layer 14 and the composite body 12 may be effected by bonding the detection layer 14 to the composite body 12, such as with an adhesive (e.g., a two-part epoxy adhesive).

Figure 13:
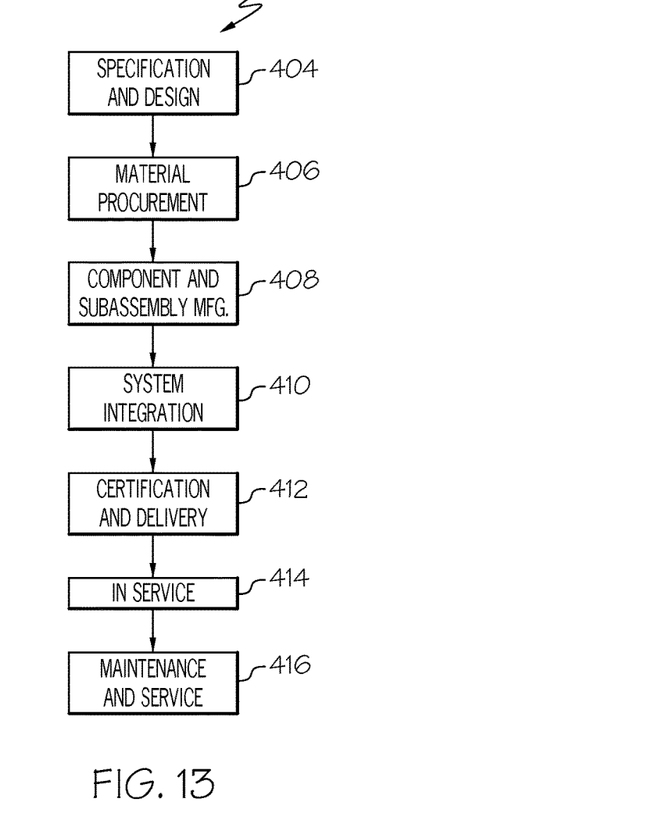
FIG. 13 is flow diagram of an aircraft manufacturing and service methodology.

Examples of the disclosure may be described in the context of an aircraft manufacturing and service method 400, as shown in FIG. 13, and an aircraft 402, as shown in FIG. 14. During pre-production, the aircraft manufacturing and service method 400 may include specification and design 404 of the aircraft 402 and material procurement 406. During production, component/subassembly manufacturing 408 and system integration 410 of the aircraft 402 takes place. Thereafter, the aircraft 402 may go through certification and delivery 412 in order to be placed in service 414. While in service by a customer, the aircraft 402 is scheduled for routine maintenance and service 416, which may also include modification, reconfiguration, refurbishment and the like.

Each of the processes of method 400 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 14, the aircraft 402 produced by example method 400 may include an airframe 418 with a plurality of systems 420 and an interior 422. Examples of the plurality of systems 420 may include one or more of a propulsion system 424, an electrical system 426, a hydraulic system 428, and an environmental system 430. Any number of other systems may be included.

The disclosed composite structure and method for barely visible impact damage detection may be employed during any one or more of the stages of the aircraft manufacturing and service method 400. As one example, the disclosed composite structure and method for barely visible impact damage detection may be employed during material procurement 406. As another example, components or subassemblies corresponding to component/subassembly manufacturing 408, system integration 410, and or maintenance and service 416 may be fabricated or manufactured using the disclosed composite structure and method for barely visible impact damage detection. As another example, the airframe 418 and/or the interior 422 may be constructed using the disclosed composite structure and method for barely visible impact damage detection. Also, one or more apparatus examples, method examples, or a combination thereof may be utilized during component/subassembly manufacturing 408 and/or system integration 410, for example, by substantially expediting assembly of or reducing the cost of an aircraft 402, such as the airframe 418 and/or the interior 422. Similarly, one or more of system examples, method examples, or a combination thereof may be utilized while the aircraft 402 is in service, for example and without limitation, to maintenance and service 416.

The disclosed composite structure and method for barely visible impact damage detection are described in the context of an aircraft; however, one of ordinary skill in the art will readily recognize that the disclosed composite structure and method for barely visible impact damage detection may be utilized for a variety of vehicles. For example, implementations of the embodiments described herein may be implemented in any type of vehicle including, e.g., helicopters, passenger ships, automobiles and the like.

Although various embodiments of the disclosed composite structure and method for barely visible impact damage detection have been shown and described, modifications may occur to those skilled in the art upon reading the specification. The present application includes such modifications and is limited only by the scope of the claims.

What is claimed is:

1. A composite structure comprising:
a composite body having an outer surface; and
a detection layer connected to said outer surface, said detection layer including a plurality of discontinuities between adjacent portions of the detection layer, said detection layer comprising glass fibers and a matrix material.

2. The composite structure of claim 1 wherein said composite body comprises carbon fiber-reinforced plastic.

3. The composite structure of claim 1 wherein said composite body comprises a laminate structure comprising a plurality of composite plies, wherein each ply of said plurality of composite plies comprises a reinforcement material and a matrix material.

4. The composite structure of claim 3 wherein said reinforcement material comprises carbon fibers.

5. The composite structure of claim 1 wherein said matrix material comprises epoxy resin.

6. The composite structure of claim 1 wherein said detection layer has a total cross-sectional thickness ranging from about 0.005 inch to about 0.050 inch.

7. The composite structure of claim 1 wherein said detection layer comprises at least two plies.

8. The composite structure of claim 1 wherein said detection layer comprises at least one ply having a cross-sectional thickness ranging from about 0.005 inch to about 0.015 inch.

9. The composite structure of claim 1 wherein said detection layer comprises a plurality of strips, and wherein each strip of said plurality of strips is spaced a distance apart from adjacent strips of said plurality of strips.

10. The composite structure of claim 9 wherein said distance is at least 0.1 inch.

11. The composite structure of claim 9 wherein said detection layer further comprises a first extension member, and wherein each strip of said plurality of strips is connected to said first extension member.

12. The composite structure of claim 11 wherein said detection layer further comprises a second extension member spaced apart from said first extension member, and wherein each strip of said plurality of strips is also connected to said second extension member.

13. The composite structure of claim 1 configured as a stringer comprising:
a web portion having a proximal end and a distal end; and
a base portion connected to said proximal end,
wherein said detection layer is connected to said distal end of said web portion.

14. The composite structure of claim 13 wherein said composite body comprises carbon fiber-reinforced plastic.

15. The composite structure of claim 13 wherein said detection layer has a total cross-sectional thickness ranging from about 0.005 inch to about 0.050 inch.

16. The composite structure of claim 13 wherein said detection layer comprises at least one ply having a cross-sectional thickness ranging from about 0.005 inch to about 0.015 inch.

17. The composite structure of claim 13 wherein said detection layer comprises a plurality of strips, and wherein each strip of said plurality of strips is spaced a distance apart from adjacent strips of said plurality of strips.

18. A composite structure comprising:
a composite body having an outer surface; and
a detection layer connected to said outer surface, said detection layer including a first portion, a second portion, and a discontinuity between the first portion and the second portion, said detection layer comprising glass fibers and a matrix material,
wherein a portion of the composite body is visible at the discontinuity.

19. A composite structure comprising:
a composite body having an outer surface; and
a detection layer connected to said outer surface, said detection layer including a first portion, a second portion, and a discontinuity between the first portion and the second portion, said detection layer comprising glass fibers and a matrix material,
wherein the discontinuity includes a slot in the detection layer.

20. The composite structure of claim 19 wherein the composite body includes a first major surface, a second major surface, and an edge between the first major surface and the second major surface, and wherein the slot extends across the edge from the first major surface to the second major surface.

* * * * *